(12) United States Patent  
Mensch

(10) Patent No.: US 7,891,048 B2
(45) Date of Patent: Feb. 22, 2011

(54) VACUUM TRUCK WITH COLLAPSIBLE SCRAPER AND PIVOT RELIEF

(76) Inventor: Donald L. Mensch, 314-100$^{th}$ St., SE., Byron Center, MI (US) 49315

( * ) Notice: Subject to any disclaimer, the term of this patent is extended or adjusted under 35 U.S.C. 154(b) by 359 days.

(21) Appl. No.: 12/127,292

(22) Filed: May 27, 2008

(65) Prior Publication Data

US 2009/0293220 A1 Dec. 3, 2009

(51) Int. Cl.
*E01H 1/08* (2006.01)
*E01H 5/04* (2006.01)

(52) U.S. Cl. .............. 15/340.1; 15/340.2; 15/340.3; 15/340.4; 37/231

(58) Field of Classification Search ..... 15/340.1–340.4; 37/231

See application file for complete search history.

(56) References Cited

U.S. PATENT DOCUMENTS

| | | | |
|---|---|---|---|
| 1,514,248 A | 11/1924 | Bergman | |
| 1,572,913 A | 2/1926 | Finnell | |
| 2,610,351 A * | 9/1952 | Howard | 15/401 |
| 2,876,484 A | 3/1959 | Wells | |
| 2,986,826 A * | 6/1961 | Timmons | 37/403 |
| 3,189,932 A * | 6/1965 | Daneman | 15/340.3 |
| 3,231,991 A * | 2/1966 | Wandscheer et al. | 37/280 |
| 3,585,670 A | 6/1971 | MacKinnon | |
| 3,634,903 A | 1/1972 | Larsen | |
| 3,722,025 A * | 3/1973 | Gledhill | 15/359 |
| 4,289,439 A | 9/1981 | Hansson | |
| 5,010,620 A | 4/1991 | Young | |
| 5,241,763 A | 9/1993 | Dynan | |
| 5,839,157 A | 11/1998 | Strauser et al. | |
| 6,000,647 A | 12/1999 | Hardy | |
| 6,446,298 B1 | 9/2002 | Berg, Jr. et al. | |
| 2006/0236498 A1 * | 10/2006 | Nuhn | 15/340.1 |

* cited by examiner

*Primary Examiner*—Bryan R Muller
(74) *Attorney, Agent, or Firm*—Price, Heneveld, Cooper, DeWitt & Litton, LLP

(57) ABSTRACT

A scraper truck includes a main scraper mounted to a wheeled vehicle and side scrapers pivoted to the main scraper at its ends. The side scrapers are pivotally movable between extended lateral positions where the side scrapers extend outboard of the opposite ends for collecting debris located outboard of the vehicle's width, and a retracted position where the side scrapers are in overlapped juxtaposed storage positions close to and in front of the main scraper. The main scraper has a front face that is concavely shaped. The scraper mount defines a vertical pivot axis and the scraper assembly is rotatable about the vertical pivot axis upon striking an object toward an end of the scraper. A biasing mechanism is provided for biasing the scraper toward a centered forwardly-facing position, and a shear pin is configured to break prior to damage to the scraper or vehicle frame.

10 Claims, 4 Drawing Sheets

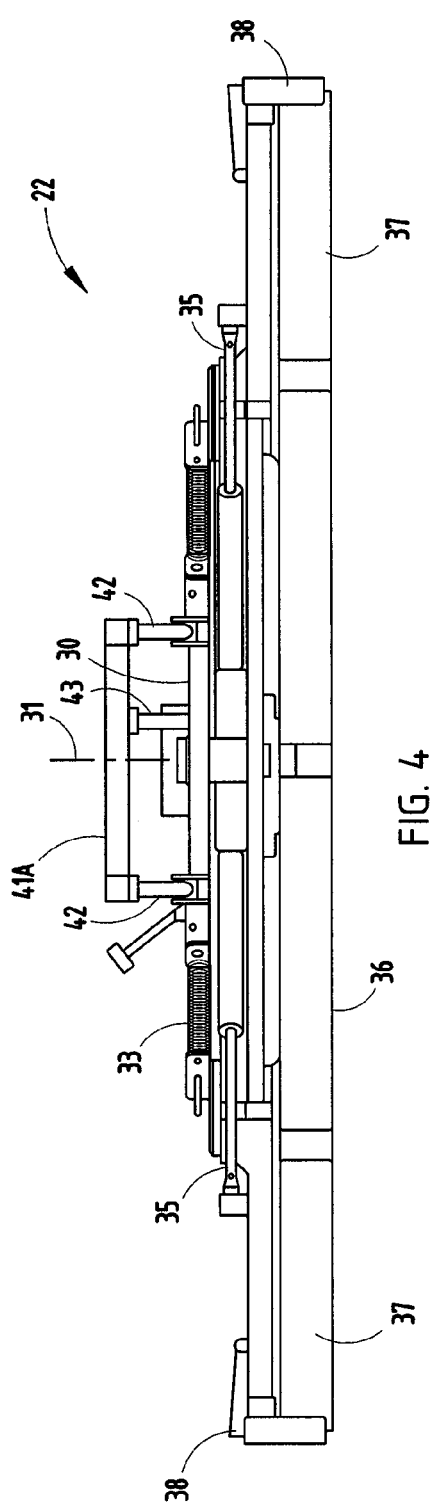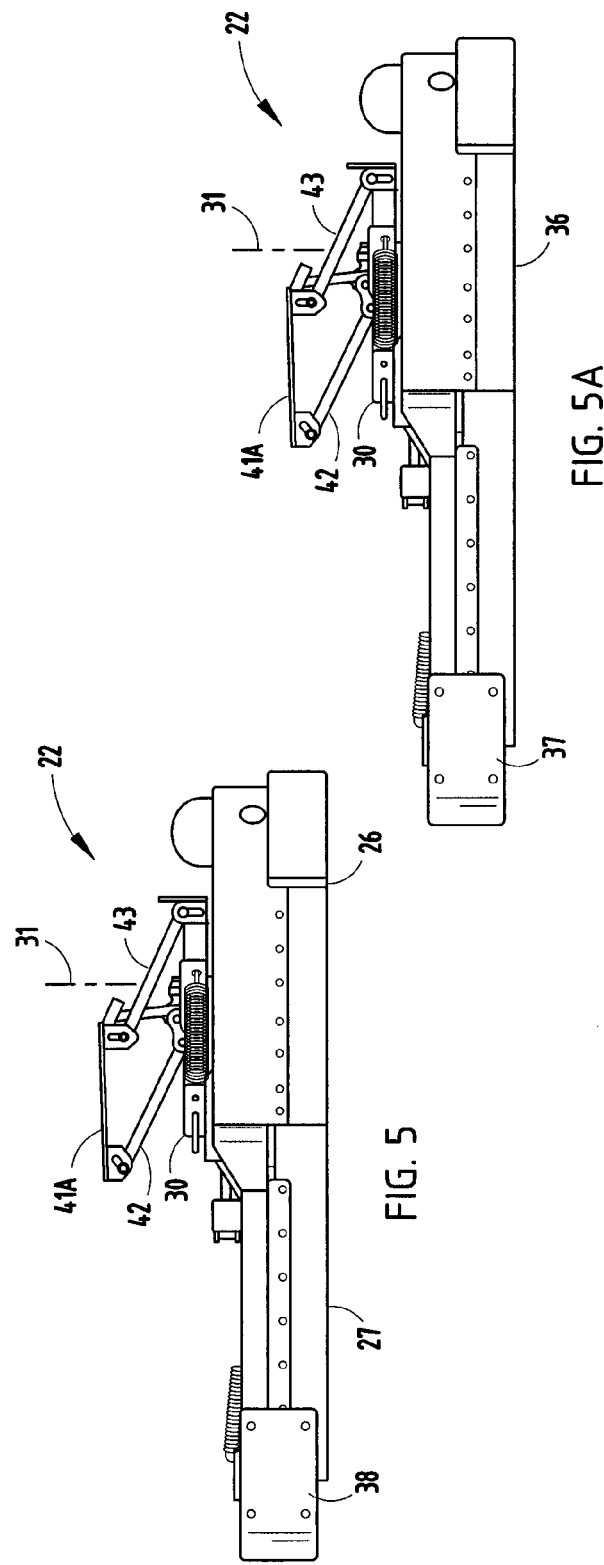

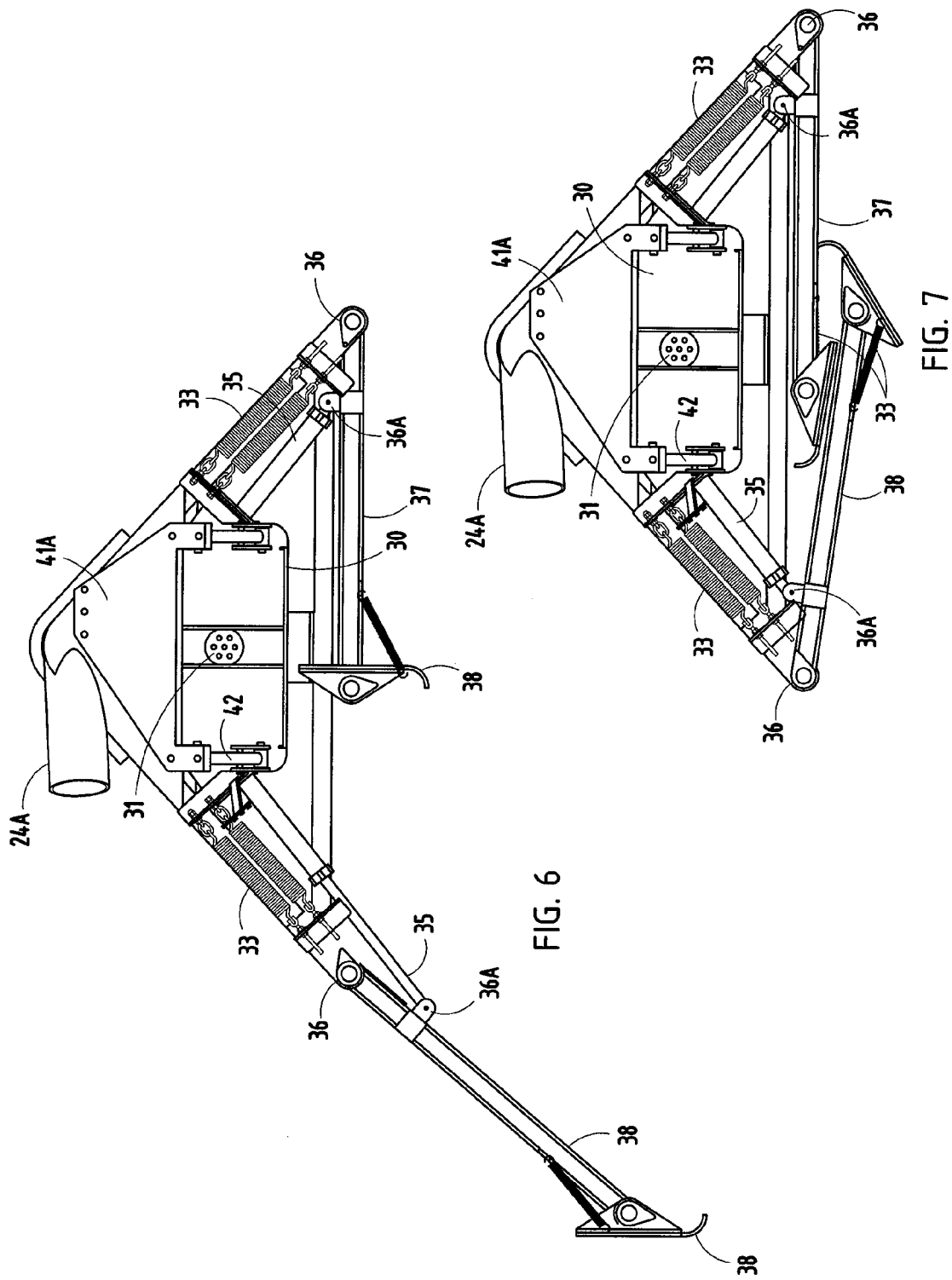

VACUUM TRUCK WITH COLLAPSIBLE SCRAPER AND PIVOT RELIEF

BACKGROUND

The present invention relates to scrapers for vacuum trucks, such as for collection of manure and stall material from animals in large farm operations.

Large farming operations need to regularly remove manure and bedding. A problem is that aisles along and between stalls are often narrow (or irregular in width or direction), poorly lighted, and include obstructions (e.g., numerous irregularities and protruding objects), making them very difficult to scrape and clean. Further, equipment must often be moved significant distances between barns in order to take care of the various barns. Presently known equipment is difficult to use and often provides poor visibility to the operator, poor control over scrapers, and further is cumbersome, overly complex, and difficult to repair. Further, known equipment is not well-configured for fast transport, such that the equipment often gets damaged when traveling quickly between barn locations . . . or cannot be driven quickly.

SUMMARY OF THE PRESENT INVENTION

In one aspect of the present invention, a scraper truck includes a powered steerable wheeled vehicle, a liftable main scraper mounted to the wheeled vehicle, and a vacuum system on the vehicle for suctioning material collected by the main scraper. The truck further includes right and left side scrapers mounted to opposite ends of the main scraper and pivotally movable between extended lateral positions where the side scrapers extend outboard of the opposite ends of the main scraper for collecting debris located outboard of a width of the vehicle, and a retracted position where the side scrapers are positioned in front of the main scraper in overlapped juxtaposed storage positions close to the main scraper to facilitate fast transport with minimal risk of damage.

In another aspect of the present invention, a scraper truck includes a powered steerable wheeled vehicle frame defining a longitudinal axis and including a scraper mount. A scraper assembly is attached to the wheeled vehicle by the scraper mount, the scraper assembly including a scraper with a front face that is concavely shaped and that extends generally perpendicular to the longitudinal axis. A vacuum system is mounted on the vehicle for suctioning material collected by the scraper. The truck further includes the scraper mount defining a centrally-located vertical pivot axis and the scraper assembly being rotatable about the vertical pivot axis such that upon striking an object toward an end of the scraper the risk of damage is minimized. A biasing mechanism is provided for biasing the scraper toward a centered forwardly-facing position.

In another aspect of the present invention, a scraper truck includes a powered steerable wheeled vehicle, a scraper assembly mounted to the wheeled vehicle, and a vacuum system on the vehicle for suctioning material collected by the scraper assembly. The scraper assembly includes a main scraper and also right and left side scrapers pivotally mounted by pivot structure to opposite ends of the main scraper. Actuators, connected with connecting structure, extend between each of the side scrapers and the wheeled vehicle to move the side scrapers between extended lateral positions where the side scrapers extend outboard of the opposite ends of the main scraper for collecting debris located outboard of a width of the vehicle, and a retracted position where the side scrapers are positioned in front of the main scraper for transport. Shear pins are placed in one or both of the pivot structures and the connecting structures to shear when an obstruction is impacted by the scraper assembly to avoid damage to components.

These and other aspects, objects, and features of the present invention will be understood and appreciated by those skilled in the art upon studying the following specification, claims, and appended drawings.

BRIEF DESCRIPTION OF DRAWINGS

FIGS. 2-5 are perspective and orthogonal views of the scraper assembly of FIG. 1, and FIG. 5A is a line drawing of FIG. 5.

FIGS. 6-7 are top views of the scraper assembly of FIG. 1, FIG. 6 having one side scraper in a retracted storage position and FIG. 7 having both side scrapers in their retracted storage positions.

DETAILED DESCRIPTION OF PREFERRED EMBODIMENTS

Figure 1:
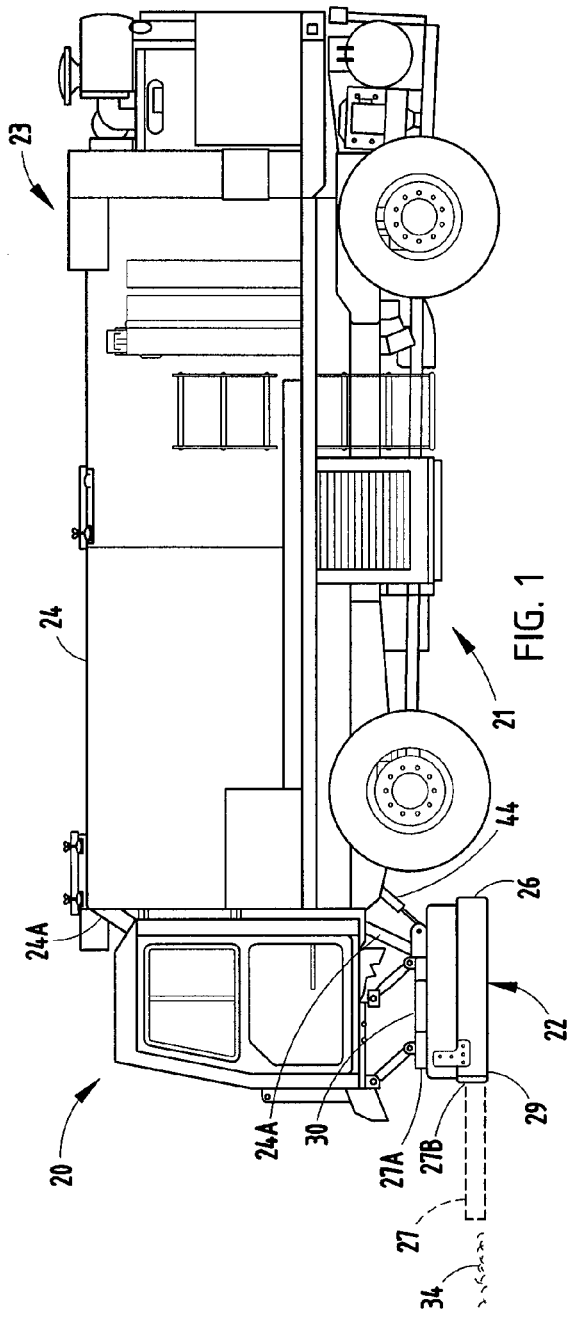
FIG. 1 is a side view of a vacuum truck including a scraper assembly embodying the present invention.
Figure 2:
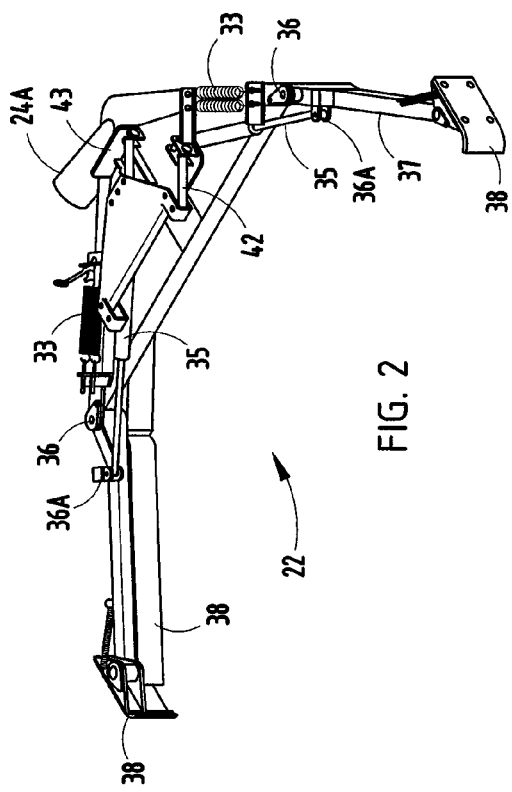
Figure 3:
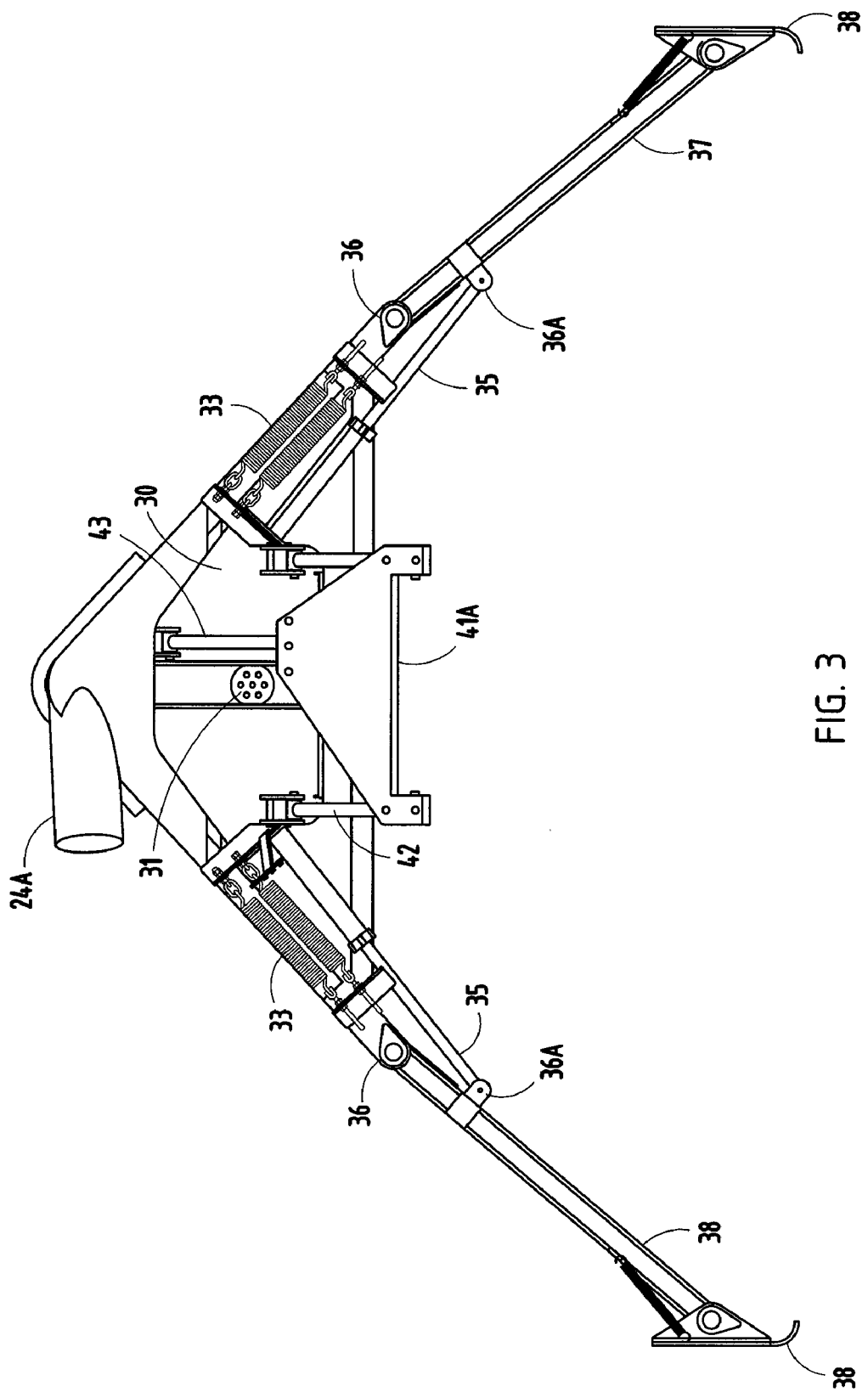

A scraper truck (or vehicle) 20 (FIG. 1) includes a powered steerable wheeled vehicle frame 21 with front-located windowed driver's cabin, a retractable liftable scraper assembly 22 mounted to the wheeled vehicle frame 21 under the cabin, and a vacuum system 23 with tank 24 on the truck 20 for suctioning collected debris material 34 collected by the scraper assembly 22 along a semi-rigid flexible suction line 24A. The scraper assembly 22 includes a main scraper 26 and left and right side scrapers 27 and 28 pivotally mounted to opposite ends 29 and 30 of the main scraper 26. The side scrapers 27 and 28 are horizontally pivotally movable by actuators 27A and 28A about vertical pivots 27B and 28B between extended lateral positions (FIGS. 2-5) where the side scrapers 27 and 28 extend outboard and forward of the opposite ends of the main scraper 26 for collecting debris 34 (e.g., animal manure and bedding material) located outboard of a width of the truck 20 (such as debris 34 located up to 4 feet outside a width of the truck 20). The side scrapers 27 and 28 are individually movable to a retracted position (FIGS. 6-7) where the side scrapers 27 and 28 are positioned in front of the main scraper 26 in overlapped juxtaposed storage positions (see FIG. 7) close to a face of the main scraper 26. In this overlapped storage position, the side scrapers 27-28 are positioned in a partially protected position against a face of the main scraper 26 in order to facilitate fast transport with minimal risk of damage. For example, the present truck 20 can travel at significant speeds, such as 30-40 mph without risking damage to the scraper assembly 22, since the scraper assembly is lifted several inches and further none of the scrapers 26-28 protrude from under the truck 20. This also helps in cornering and overall control of the truck 20.

The scraper assembly 22 is attached to the wheeled vehicle frame 21 by a scraper mount 30 that defines a centrally-located vertical pivot axis 31 along a front of the longitudinal centerline of the frame 21. The pivot axis 31 is generally located at a center of gravity of the scraper assembly 22 when in its lifted raised position. The scrapers 26-28 define a concave front face for collecting debris 34, the concave face extending generally transverse to the longitudinal axis of the truck 20 and being located at and facing toward a front of the vehicle frame 21. The scraper assembly 22 is rotatable about the vertical pivot axis 31 such that, upon striking an object toward an end of the scraper assembly 22, the scraper assembly 22 pivots or "turns," rather than causing damage to components of the scraper assembly 22 or damage to other components on the truck 20. A biasing mechanism (i.e., springs 33) rotatingly bias the scraper assembly 22 back toward a centered forwardly-facing position. Notably, it is contemplated that more (or less) springs 33 can be used, or a different bias mechanism can be used. Actuators 35 are attached using connecting structure between the scraper assembly 22 and the vehicle frame 21. Shear pins 36 and 36A are used in the connecting structure of the actuators 35 and/or on the pivot structure connecting the side scrapers 27,28 to the main scraper 26, such as by using the shear pins as the hinge pin/pivot axis for the joint between overlapped aperture flanges. The shear pins 36 and 36A are selected to shear upon receiving a predetermined damaging impact against the scraper assembly 22, such as when a protruding object strikes against an end of one of the scrapers 26-28. Sled-runner-shaped shoes 38 with a curved front end are pivotally attached to an outer end of the side scrapers 27-28 to assist in the side scrapers 27-28 sliding past obstacles and protrusions along a curb. A spring biases the shoes 38 to a desired angular position on the scraper wings.

The mount 30 of the scraper assembly 22 includes a top plate 30 attached to a mounting carrier plate 41A on the vehicle frame 21 by links 42-43 in a four-bar arrangement (with the four bars being the plates 30, 41A and the links 42-43). The top plate 30 includes pivot structure defining the pivot axis 31 on which the scraper assembly 22 is mounted. Actuators 44 are operably interconnected between the top plate 30 and the vehicle frame 21 to selectively move the scraper assembly 22 between a raised position adjacent an underside of the vehicle frame 21 and to a lowered position (FIG. 1) where the scrapers 26-28 engage a floor/ground surface. Shear pins 36A are used to connect the actuators 44 to support structure.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A scraper truck comprising:
    a powered steerable wheeled vehicle frame defining a longitudinal axis and including a scraper mount;
    a scraper assembly attached to the wheeled vehicle by the scraper mount, the scraper assembly including a main scraper that is concavely shaped and that extends generally perpendicular to the longitudinal axis;
    a vacuum system on the vehicle for suctioning material collected by the scraper; and
    the scraper mount defining a centrally-located vertical pivot axis at a center of gravity of the scraper assembly when in a raised position and the scraper assembly being rotatable about the vertical pivot axis such that upon striking an object toward an end of the scraper the risk of damage is minimized;
    a biasing mechanism for biasing the scraper toward a centered forwardly-facing position and right and left side scrapers mounted to opposite ends of the main scraper and pivotally movable between extended lateral positions where the side scrapers extend outboard of the opposite ends of the main scraper for collecting debris located outboard of a width of the vehicle, and a retracted position where the side scrapers are positioned in front of the main scraper in overlapped juxtaposed storage positions close to the main scraper to facilitate fast transport with minimal risk of damage.

2. The truck as defined in claim 1, wherein the powered steerable wheeled vehicle includes a front-located driver's cabin;
    the liftable main scraper is mounted to the wheeled vehicle under the cabin and in front of wheels on the vehicle; and
    at least one of the side scrapers when in the retracted position extends perpendicular to the longitudinal axis of the vehicle, and both of the side scrapers being positioned under the cabin in partially protected positions to facilitate fast transport with minimal risk of damage.

3. The truck as defined in claim 1, wherein the biasing mechanism includes springs.

4. The truck as defined in claim 1, including at least one shear pin on the scraper assembly and scraper mount for releasing the scraper prior to damage to components of the vehicle frame and scraper assembly.

5. The truck as defined in claim 1, including a lift mechanism for lifting the scraper assembly from a lowered use position to a raised storage position facilitating long transport.

6. The truck as defined in claim 5, wherein the lift mechanism includes a four bar lift incorporating at least two links pivoted at each end to top and bottom plates.

7. The truck as defined in claim 1, including
    pivot structures pivotally mounting the right and left scrapers to opposite ends of the main scraper;
    actuators connected with connecting structure extending between each of the side scrapers and the wheeled vehicle to move the side scrapers between said extended lateral position and said retracted position; and
    shear pins placed in one or both of the pivot structures; the shear pins connecting the actuators to the connecting structures and being constructed to shear when an obstruction is impacted by the scraper assembly to avoid damage to components including damage to the actuators.

8. The scraper truck defined in claim 1, wherein the wheeled vehicle frame includes a front-located driver's cabin; and wherein the scraper assembly is mounted to the wheeled vehicle under the cabin and in front of wheels on the vehicle.

9. The scraper truck defined in claim 1, wherein the vertical pivot axis and center of gravity are located under a front of the wheeled vehicle frame.

10. The scraper truck defined in claim 1, wherein the wheeled vehicle frame includes a front-located driver's cabin; and including links attaching the scraper mount to the vehicle frame for lifting and lowering the scraper assembly upward and downward away from the cabin.

* * * * *